April 22, 1924.

A. P. PRINGLE

CUTTING TOOL

Filed Aug. 1, 1923

Inventor
Alta P. Pringle
By Watson E. Coleman
Attorney

Patented Apr. 22, 1924.

1,491,311

UNITED STATES PATENT OFFICE.

ALTA P. PRINGLE, OF TARENTUM, PENNSYLVANIA.

CUTTING TOOL.

Application filed August 1, 1923. Serial No. 655,094.

*To all whom it may concern:*

Be it known that I, ALTA P. PRINGLE, a citizen of the United States, residing at Tarentum, in the county of Allegheny and State of Pennsylvania, have invented certain new and useful Improvements in Cutting Tools, of which the following is a specification, reference being had to the accompanying drawings.

This invention relates to cutting tools, and particularly to cutters for cutting flowers, grapes and other stems.

The general object of the invention is to provide a device of this character which is very simple and which will permit flowers to be cut quickly and easily and in much less time than when using any other kind of flower cutting implement.

Other objects will appear in the course of the following description.

My invention is illustrated in the accompanying drawings, wherein:—

Referring to these drawings, it will be seen that my flower cutter comprises a blade 10 which has the form of a volute, the blade 10 having a right angularly disposed shank 11 and gradually increasing in width from this shank and then decreasing in width to the point 12 of the blade. The shank 11 is engaged with a handle 13.

Figure 1:
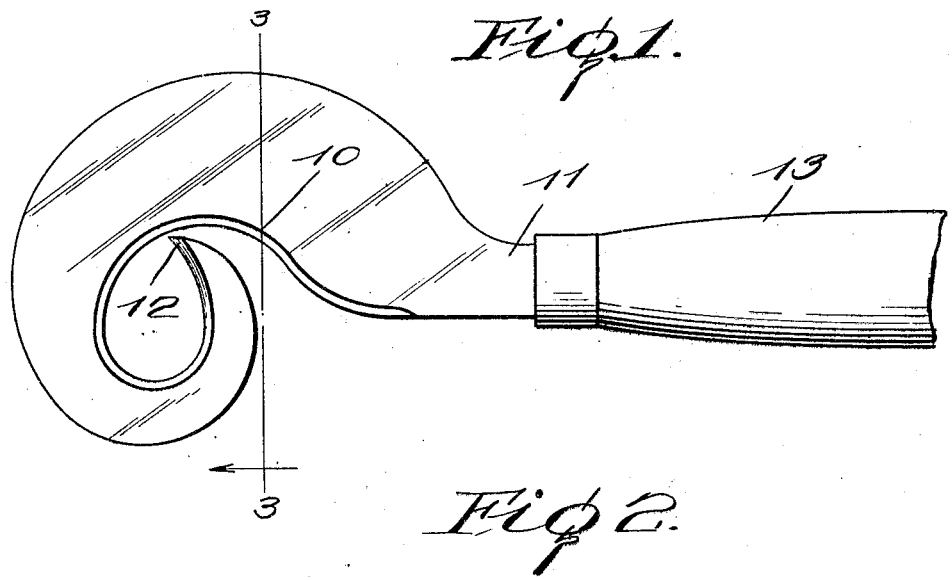
Figure 1 is a top plan view of a flower or grape cutting knife constructed in accordance with my invention.
Figure 2:
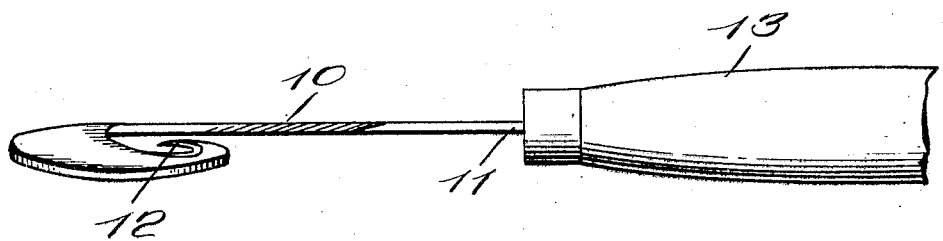
Figure 2 is an edge elevation of the knife illustrated in Figure 1.
Figure 3:
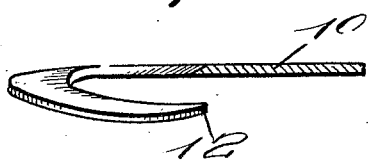
Figure 3 is a section on the line 3—3 of Figure 1.

Looking at an edge elevation of the blade, as shown in Figure 2, it will be seen that the blade has the form of a slight helix so that the point 12 extends toward the cutting edge 14 of the blade but terminates short of the said cutting edge but slightly to one side of the cutting edge of the body of the blade. The volute form of the blade acts to hold the flower steady while it is being cut off.

A flower is difficult to cut off, and this is especially true of roses. When an ordinary knife is used to sever a stem, the knife is pressed against the stem and this gradually causes the stem to lean away from the blade and it is necessary to follow the stem up before it may be finally cut off. This is not necessary with my knife. The helical blade is slipped around the flower and then by a circular action the volute cutting edge 14 cuts the same without any chance of the flower leaning away from the cutter.

I claim:—

A flower cutting knife of the character described comprising a thin blade having the form of a helical volute, the blade having a shank and a handle, the blade increasing in width from the shank for a certain distance and then decreasing in width to the point, that portion of the blade extending from the maximum width of the blade to the point being curved around in a generally circular form, the inner edge of the blade being sharpened and the point of the blade being disposed slightly below the level of and adjacent to the widest portion of the blade and extending toward the body of the blade nearly at right angles thereto.

In testimony whereof I hereunto affix my signature.

ALTA P. PRINGLE.